US008205541B2

(12) United States Patent
Barberio et al.

(10) Patent No.: US 8,205,541 B2
(45) Date of Patent: Jun. 26, 2012

(54) WINE POURING REGULATOR AND AERATOR THEREIN

(76) Inventors: Janet Barberio, Rochester, NY (US); Paul J. Brennan, Rochester, NY (US)

( * ) Notice: Subject to any disclaimer, the term of this patent is extended or adjusted under 35 U.S.C. 154(b) by 779 days.

(21) Appl. No.: 12/181,659

(22) Filed: Jul. 29, 2008

(65) Prior Publication Data

US 2010/0011967 A1 Jan. 21, 2010

Related U.S. Application Data

(60) Provisional application No. 60/954,147, filed on Aug. 6, 2007.

(51) Int. Cl.
*B67D 3/00* (2006.01)
*C12G 3/06* (2006.01)
*B65B 39/00* (2006.01)

(52) U.S. Cl. ...... 99/277.1; 99/323.1; 222/567; 222/566; 426/474

(58) Field of Classification Search ................. 99/277.1, 99/323.1; 222/567, 563, 568, 566; 210/472, 210/474, 477, 22, 695, 485, 767, 799; 366/336, 366/339, 340; 426/474
See application file for complete search history.

(56) References Cited

U.S. PATENT DOCUMENTS 3,926,348 A 12/1975 Lutzker
3,951,798 A 4/1976 Haldopoulos
4,162,129 A 7/1979 Bartholemew
4,202,635 A * 5/1980 Hendrickson .............. 366/162.3
4,494,452 A 1/1985 Barzso
4,749,527 A * 6/1988 Rasmusen ........................ 261/76
4,785,724 A 11/1988 Vassallo
4,984,711 A * 1/1991 Ellis ................................ 222/82
5,154,112 A 10/1992 Wettern
5,167,819 A 12/1992 Iana et al.
5,293,912 A 3/1994 Wildash
5,417,860 A 5/1995 Kay
5,531,254 A 7/1996 Rosenbach
5,595,104 A 1/1997 Delaplaine
5,616,242 A 4/1997 Mandola
5,713,263 A 2/1998 Burks, III
5,799,836 A 9/1998 Lee
D421,908 S 3/2000 Abrams
6,165,362 A 12/2000 Nohren, Jr. et al.
D437,782 S 2/2001 Haley et al.
(Continued)

FOREIGN PATENT DOCUMENTS

DK P200501279 12/2005

OTHER PUBLICATIONS

Wine Enthusiast; 3 webpages: wineenthusiast.com; Oct. 10, 2007; Product Nuance Wine Finer Item 511 10.

(Continued)

*Primary Examiner* — Reginald L Alexander

(74) *Attorney, Agent, or Firm* — Duane C. Basch; Basch & Nickerson LLP

(57) ABSTRACT

A bottle top regulator/aerator for controlling the flow from a bottle having a narrow cylindrical opening through which wine or similar liquid may be poured. The dispensing apparatus includes, in combination, an air inductor, a regulating cartridge having a percolation labyrinth, and an anti-drip trough integrated within a housing. The application of this apparatus provides for both the rapid aeration of the wine, as well as a uniform flow rate absent the hazard of post-pouring droplets.

15 Claims, 7 Drawing Sheets

U.S. PATENT DOCUMENTS

| | | | | |
|---|---|---|---|---|
| 6,332,706 | B1 | 12/2001 | Hall | |
| 6,395,170 | B1 | 5/2002 | Hughes et al. | |
| 6,508,163 | B1 | 1/2003 | Weatherill | |
| 7,111,747 | B2 | 9/2006 | Paikin et al. | |
| D535,559 | S | 1/2007 | Kehoe | |
| 7,198,400 | B2 * | 4/2007 | Unterlander et al. | 366/336 |
| 2002/0117055 | A1 | 8/2002 | Liebmann | |
| 2004/0124136 | A1 * | 7/2004 | Bak | 210/512.1 |
| 2005/0205609 | A1 | 9/2005 | Moore | |
| 2008/0073383 | A1 * | 3/2008 | McDonald | 222/500 |

OTHER PUBLICATIONS

Panik; Spinwater—Klaus Kolding—SpinWine WinePourer (Spinwater) Designer: Klaus Kolding Designed: 2007SpinWine Wine Pourer Origin: Denmark, Jul. 2008.

Wine Enthusiast; Aerating funnel with screen and stand; Webpage—wineenthisiast.com; 1 page Item 511 05, Oct. 2007.

Super Oxygenating Aerating funnel for decanters; Web page—winegiftcentre.com 1 page, Jul. 2008.

deSign Wine Aerator; Fine Wine Toys; Web Page—finewinetoys.com 1 page, Jul. 2007.

Vinturi Essential Wine Aerator; web page—vinturi.com 1 page, Jul. 2008.

Winebreather; Air au Van Wine Breather; web page winebreather.com 2 pages, Jul. 2008.

The Wine Cellars, Inc.; Dtop Drop Wine Pouer; winecellarsonline.com; 1 webpage, Jul. 2007.

High Gravity Homebrewing & Winemaking Supplies; Drip Disks; highgravitybrew.com; 1 webpage, Jul. 2007.

Wally's; Epic Disk Pour Disk; wallywine.com; 1 webpage, Jul. 2006.

Liquorama; Dripless Pour Disk; liquorama.com; 1 webpage, Jul. 2007.

MSC International; Wine Server; msc-international.com/CatalogMSC__2007; 3 webpages, Dec. 2004.

BC Specialities; Wine Pourers; bcspecialties.com; 2 webpages, Jul. 2007.

* cited by examiner

WINE POURING REGULATOR AND AERATOR THEREIN

This application claims priority from U.S. Provisional Patent Application 60/954,147, for a "WINE POURING REGULATOR AND AERATOR THEREIN," filed Aug. 6, 2007 by J. Barberio et al., which is hereby incorporated by reference in its entirety.

The disclosed apparatus relates to a device for controlling the flow of a liquid from a container, such as a bottle, having a narrow cylindrical opening through which wine or similar liquid may be poured, for example. The dispensing apparatus includes, a regulating cartridge, having a percolation labyrinth therein, and an anti-drip trough integrated with a pouring orifice. The use of the disclosed apparatus provides both aeration of the poured liquid, such as a wine, as well as a uniform flow rate, thereby reducing the hazard of dripping and splashing of wine while pouring.

BACKGROUND AND SUMMARY

Devices adapted for use in the aeration of wine have predominantly employed pneumatic pumps, which force air into the wine. For example U.S. Pat. Nos. 4,494,452; 4,785,724; 5,595,104 and 6,508,163 each disclose or employ a motor driven air compressor having a tube conducting air into the wine. The obvious problem with such solutions, aside from the obtrusive mechanics and power requirements, is the adverse agitation and mixing of the sediment back into the wine. Another aeration apparatus is disclosed in U.S. Pat. No. 6,332,706, where a rotary magnetic mixer motivates a ferrous stir bar within the wine to create a vortex to "pull" air into the vortex for mixing with the wine. Again, while this does tend to add air to the wine, it also stirs up the sediment.

A liquid, such as wine, poured from a bottle having a narrow cylindrical opening tends to come out in spurts rather than in a continuous and steady stream. Traditionally, wine is poured so as to completely flood the neck and thereby causing a vacuum to form in the bottle. Additionally, as the volume depletes the server must be constantly aware of, and adjusting the pour angle, which requires concentration, experience and most of all talent. Accordingly, the traditional ritual of wine pouring often results in over filling and spillage because it is difficult to smoothly pour a liquid from a container having an elongated and narrow neck that is filled with wine. This spurting behavior of any liquid being poured from a bottle is a consequence of fluid mechanics as gravity draws the liquid through the narrow opening. The forces acting on a column of liquid in a container however, not only include a gravitational force, but also a reactive force from the differential pressure of the atmosphere inside and outside of the bottle. When a container with a narrow neck is tipped at an angle to facilitate pouring, liquid initially pours smoothly out of the opening in the neck of the container due to only the force of gravity acting upon the fluid. However, as liquid is further displaced from the bottle, a negative pressure, or vacuum, forms within the now captive air space located directly behind the liquid.

In an attempt to equalize the vacuum formed in this void with the outside ambient atmospheric pressure, air will intermittently enter into the downstream flow, so as to equalize the pressure of the air space in the container, by injecting a "bubble" of air into the stream and thereby offsetting a volume of the wine and in so doing disrupts the laminar flow. Thus, the pressure of the discharged fluid or stream varies over time as air is sporadically admitted into the bottle and the flow of the liquid is interrupted accordingly. This divergence of incoming air results in objectionable spurting or chugging behavior which adversely affects the trajectory of the fluid exiting the opening of the tilted bottle. Hence, one aspect of the disclosed apparatus is directed to the accurate, and controlled, pouring of wine from a substantially tilted bottle.

One solution currently practiced to remedy the aforementioned pouring problem is to provide wine in a compliant bladder having a spigot attached thereto. This "box of wine" packing concept has met with favor to those individuals consuming large amounts of wine who are indifferent to the traditional decorum and desirable decanting of premium wine. Accordingly, boxed wine has enjoyed mass market acceptance by the general public, based largely on the convenience of storing a large volume in a refrigerator with the capability of easily filling a glass with only the push of a button.

One aspect of the disclosed wine pouring regulator is based on a percolation labyrinth, which is defined, for the purposes of this disclosure, as a perforated baffle typically comprising crisscrossing and/or interlinking passageways in order to slowly pass the wine therethrough. The labyrinth or baffle, in one embodiment, may be produced from a wire mesh sheet that is coiled or rolled into a spiral configuration thereby forming a longitudinal cylinder-shaped baffle that is inserted within the stream to disrupt the laminar flow of wine, and thereby initiate a turbulent flow. Moreover, to mitigate the spurting problem associated with pouring a liquid from an elongated neck of a closed container, it has been further discovered that by introducing air into the neck of the bottle, in a controlled and uniform manner, encourages the outflow to form a consistent stream.

It is therefore an object of the disclosed wine pouring regulator to provide a regulated and controlled pouring stream or volume, resulting in a predictable pour.

A further aspect of the disclosed regulator is also attributed to the aforementioned percolation labyrinth to provide an aeration means, whereby air is drawn into and mixed with wine passing through the labyrinth located within a chamber of the housing. As a result of the pressure differential, air is further dispersed within the wine as it is being poured. Most red wines need to be aerated before consumption to complete the volatilization of sulphurous anhydride, as well as remove the strong taste of tannin, a by-product of wine fermentation left in the wine as a natural preservative. Wine begins to oxidize once it comes in contact with air and more specifically, with the oxygen present in the air. The aeration aspect of the disclosed regulator effectuates a much greater volume of air intermixing with the wine than would be possible by simply pouring wine from a bottle, because the air is dispersed into micro-bubbles to increase the overall area of air integration. An additional underlying principle of aeration facilitated by the labyrinth is based on the fact that a larger bubble tends to gravitate more rapidly through the wine thereby expelling much of its wine treating oxygen uselessly into the bottle. Thus, it is important that the air be reduced to bubbles of the smallest possible size and allowed to percolate while passing therethrough and being absorbed within the turbulent wine within the percolation labyrinth of the regulating cartridge, thereby permitting a higher level of oxygen/exposure time and subsequent absorption efficiency.

It is therefore an object of the disclosed embodiments to provide an apparatus and method for obtaining maximum dispersion of air bubbles into a liquid passing within the neck of a bottle.

An additional and advantageous aspect of the disclosed embodiments relates to pouring wine; in particular red wine, where there is generally the formation of one or more airborne droplets dispelled from the main stream, as well as drops affixed about the rim of the bottle, that ultimately gravitate to places outside of the wine glass. A drop or droplet can be defined as a small volume of liquid, bounded completely or almost completely by free surfaces, which forms when the mass of liquid stream approaches zero.

For example, as the water is turned off from a faucet, the diminishing volume allows the surface tension to separate the stream into discrete spherical droplets, much the same as a "dripping" faucet produces drops as gravity stretches the flow and then surface tension manipulates the stream into a sphere, as it breaks away from the rim and falls in free space. Wine, having substantially the same surface tension, responds in the same manner, in that as the pouring is terminated, droplets form along the lip of the bottle. Such droplets are destined to fall away from the bottle opening, and not into the wine glass, thereby staining whatever surface they might come into contact with. This is a problem whenever the flow of liquid from an orifice is interrupted and a portion of the liquid is sheared from the mainstream by an edge of the pouring opening. The volume of the separated portion, in the form of a droplet, is not only dependant on the surface tension of the liquid, but also the lip width and acute angle of the orifice rim relative to the stream trajectory. Therefore, either reducing the specific gravity or increasing the sheer stress will likely decrease, but not eliminate, a drip. However, in the case of wine pouring, the surface tension is typically a constant of about 1.0 centipoise (cP) at room temperature, therefore the pouring lip geometry of the bottle remains to be the only viable alternative available to control droplet formation. Accordingly, the disclosed regulator strives to mitigate droplets by minimizing the thickness of the rim, thereby increasing the shear stress. In view of this, the lip or edge of the wine pouring regulator may be formed with an inwardly sloping radius or camber, wherein by returning the bottle to a vertical position the wine stream reverses direction and draws any potential droplets formed along the rim back into the bottle along the inclined radial surface.

The disclosed embodiments further address the fact that some drips are inherently formed on the rim from the distal side of the interrupted stream and therefore must be intercepted. In this case an integrated gutter or trough circumvents the perimeter of the pouring regulator to capture any such residual liquid and may subsequently drain back into the bottle or alternatively retains the liquid pending a subsequent pour. Also the trough may include a disposable absorbent material. Traditionally, to ensure drip containment, the server is encouraged to simultaneously rotate the bottle as it is returned to an upright position to collect residual wine from the rim, however this is often awkward as it requires a certain level of dexterity to raise and turn the bottle simultaneously. Therefore, it is an additional objective to capture any droplets formed from the interruption of the stream of liquid being poured.

Other and further objects, features and advantages will be apparent and the disclosed embodiments more readily understood from a reading of the following specification and by reference to the accompanying drawings forming a part thereof, wherein the examples of the presently various embodiments are given for the purposes of disclosure.

DETAILED DESCRIPTION

Figure 1:
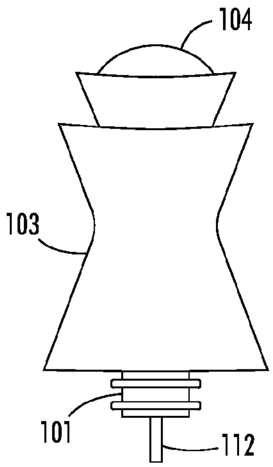
FIG. 1 is a front view of the regulator/aerator apparatus.
Figure 2A:
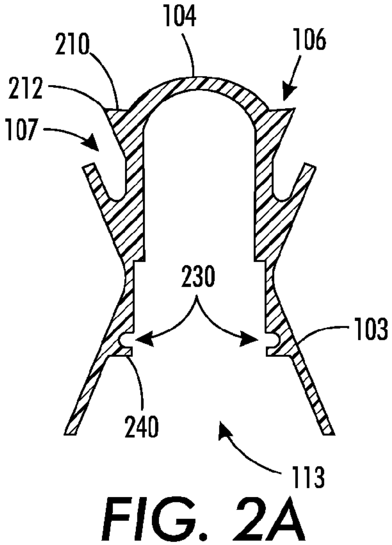
FIGS. 2A and 2B are, respectively, a cross-sectional view and a top view of the regulator housing.
Figure 2B:
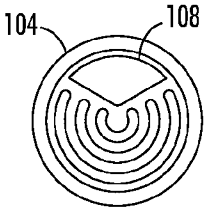

As depicted in FIG. 1 the wine pouring regulator and aerator of the disclosed embodiment includes a dome 104 that is indexed to, and fits securely within housing 103. Dome 104, as viewed in FIG. 2, includes openings 108 to pass the wine therethrough and also provides an indicia to identify the desired radial orientation of the bottle while pouring, thereby allowing for the proper positioning of housing 103 to ensure that the orientation of air vent 112 is aligned with openings 108. In an alternative embodiment cap 111 (FIG. 3) is constructed without openings, to provide a cover to seal the regulator and wine bottle, as well as to prevent any foreign material present in the atmosphere from finding their way into the bottle, most importantly insects.

Figure 3:
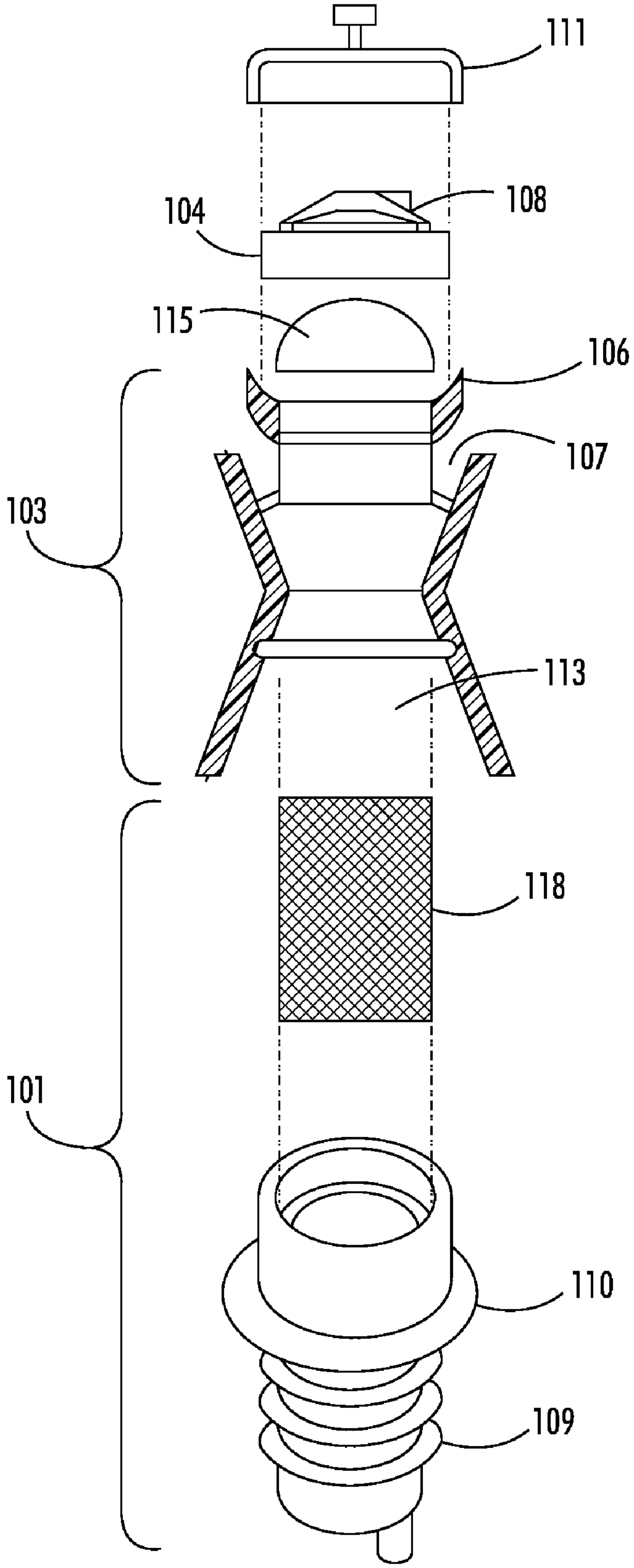
FIG. 3 is an expanded view of the regulator/aerator assembly.

Referring also to FIG. 3, cylindrical housing 103, includes pouring rim 106 and related trough 107, as well as openings 108. Housing 103 has a diameter varying between about 1.0 inches to about 2.0 inches, although it will be appreciated that to a certain extent the diameter may be a function of the actual design or ornamental appearance of the regulator itself, which may be customized for particular purchasers/users. The inner diameter of housing 103 is of a size suitable to fit over the bottle or other container to which it is attached. In one embodiment, dome 104 is approximately 0.75 inches in diameter and of a generally convex shape with a radius of curvature of between 0.4 and 0.8 inches. Dome 104 may be removable from the housing so as to permit a customized (e.g., logo) dome to be installed. For a removable embodiment, the outer dome edges may have threads (not shown) that mate with threads on an interior surface of the housing (also not shown). Alternatively, the removable embodiment may incorporate a snap-fit between mating elements using tabs and mating recesses. Pouring rim 106 incorporates an inner surface 105 having an angle between the inner rim 210 and outer rim 212 surfaces substantially equal to the pouring angle, whereas the brink of the rim (vertex of the rim angle) has a minimal thickness.

The aforementioned liquid dynamics of wine pouring require that the stream be interrupted with a high shear stress to alleviate the consequences of surface tension that transforms the diminishing stream into a plethora of droplets. The combination of the inner convex slope and the abrupt edge of the rim 106 provides for a decisive termination of the wine flow once the pouring angle is reversed. Also, as a drip containment back-up, when pouring rim 106 may have residual wine thereon, the potential drip is confined within trough 107, that further serves to manage any post-pouring wine that did not go into either the glass or the bottle, but rather was separated from the main stream. It is further contemplated that the precipitant wine within trough 107 may be drained back into bottle 122 or in an alternative embodiment, trough 107 may be constructed from, or include, an absorbent material, that is renewable. Housing 103 further includes screen 115 to provide filtration of any cork, sediment or other particulates present in the wine.

Figure 4A:
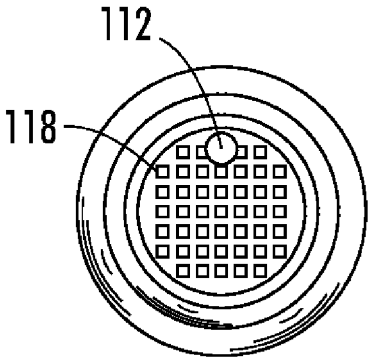
FIG. 4A is a planar top view of the regulating cartridge.
Figure 4B:
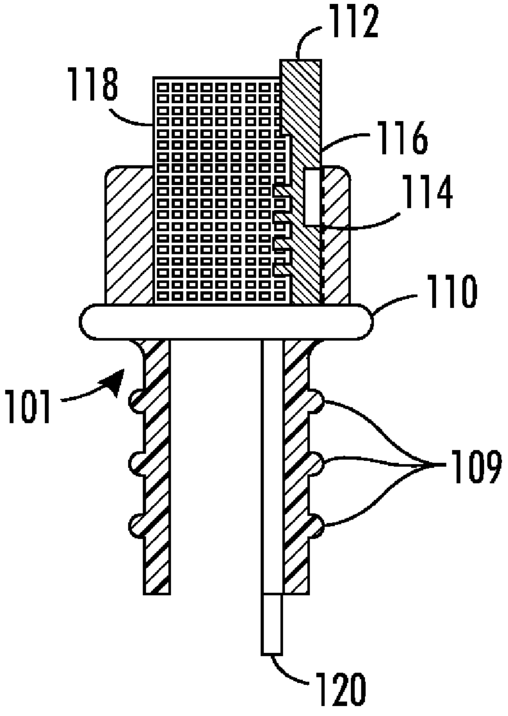
FIG. 4B is a frontal cross-sectional view of the regulating cartridge.

Referring also to FIGS. 3 and 4A-B, housing 103 also contains chamber 113 which serves as a receptacle for regulating cartridge 101 to be inserted therewithin, whereby flange 110 forms a seal between chamber 113 and bottle 122. In particular, housing 103 is designed to receive the flange 110 in the annular recess 230 indicated in FIG. 2A.

Housing 103 may be fabricated from most any nonporous materials that are FDA approved for use in food handling and furthermore are not adversely tarnished or eroded by the wine's acidity (e.g., about 0.60 grams per 100 ml). Possible materials include, but are not limited to, ferrous and non-ferrous metals and their alloys such as steel, stainless steel, aluminum, brass, zinc, nickel, copper, or various precious metals, as well as such materials having various surface treatments (e.g., anodizing, plating, etc.). Likewise, housing 103 could be manufactured from any number of plastics as well, including, but not limited to: aldehydes, polyesters, epoxides acetals, acrylics, cellulosics, chlorinated polyether, fluorocarbons, (TFE or CFE), phenoxies, polyamides, polycarbonates, polyethylenes, polyamides, polypropylenes, polystyrenes, or any of the vinyls.

Figure 5A:
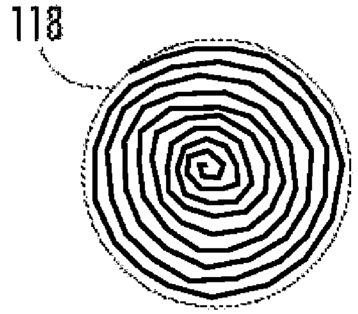
FIG. 5A is a planar top view of the spiral labyrinth.
Figure 5B:
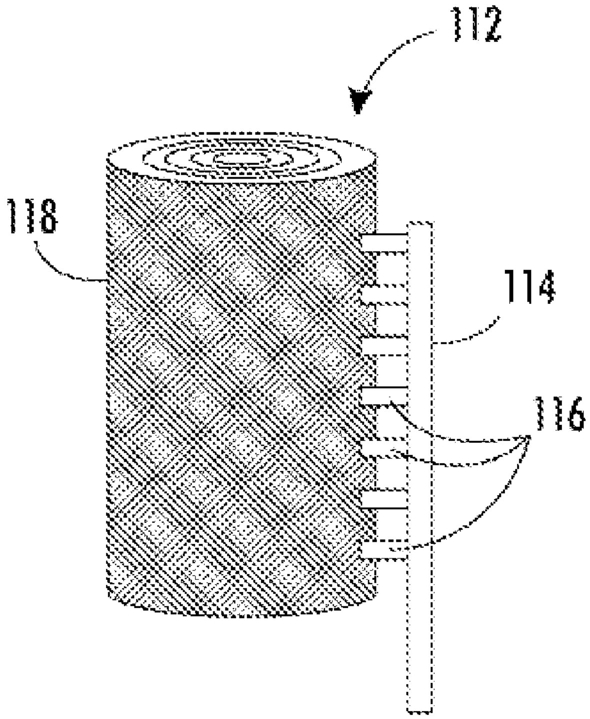
FIG. 5B is a frontal perspective view of the labyrinth.

Regulating cartridge 101, as seen in FIGS. 4A-B, in combination with FIGS. 5A-B, further incorporates insertion ribs 109 to engage the inner surface of bottle 122 to seal the wine, while rim 240 contacts the top of the bottle. A similar component is depicted in U.S. Pat. No. D437,782 to Haley et al., issued Feb. 20, 2001. Regulating cartridge 101 is a pliable cylindrically-shaped vessel constructed from a resilient material and secured within housing 103 by flange 110 and, upon insertion into the neck of bottle 122, the combination of housing 103 and regulating cartridge 101 is secured and sealed within the neck by an interference fit of insertion ribs 109. Regulating cartridge 101 may be constructed from a plurality of materials including, but, not limited to, thermal setting aldehydes, polyesters, epoxides and thermal plastic ABS, acetals, acrylics, cellulosics, chlorinated polyether, fluorocarbons (TFE) (CFE), phenoxies, polyamides, polycarbonates, polyethylenes, polyamides, polypropylenes, polystyrenes, or vinyls.

Also incorporated within regulating cartridge 101 is air vent 112, which supplies atmospheric air pressure to an optional manifold 114, which in turn injects air into labyrinth 118. Associated with manifold 114 are at least one air injecting orifice(s) 116 that serve to distribute and assimilate micro air bubbles within wine 124 as it turbulently flows through labyrinth 118 during a pour. Air is also supplied into the labyrinth 118 as a result of the negative pressure created as wine exits the bottle, the labyrinth serving to provide a means for such air to be dispersed as it enters the bottle. Percolation labyrinth 118, consists of a sheet of fine perforated mesh like material or screening that has been tightly rolled into a scroll-like, generally cylindrical shape, having a spiral multi-layer cross-section as shown in FIG. 5A. Labyrinth 118 is formed from a perforated or woven mesh (e.g., #20—T316 Stainless Steel), having a length in the range of about 5 to about 12 inches with a width of about 0.5-2 inches.

Figure 6:
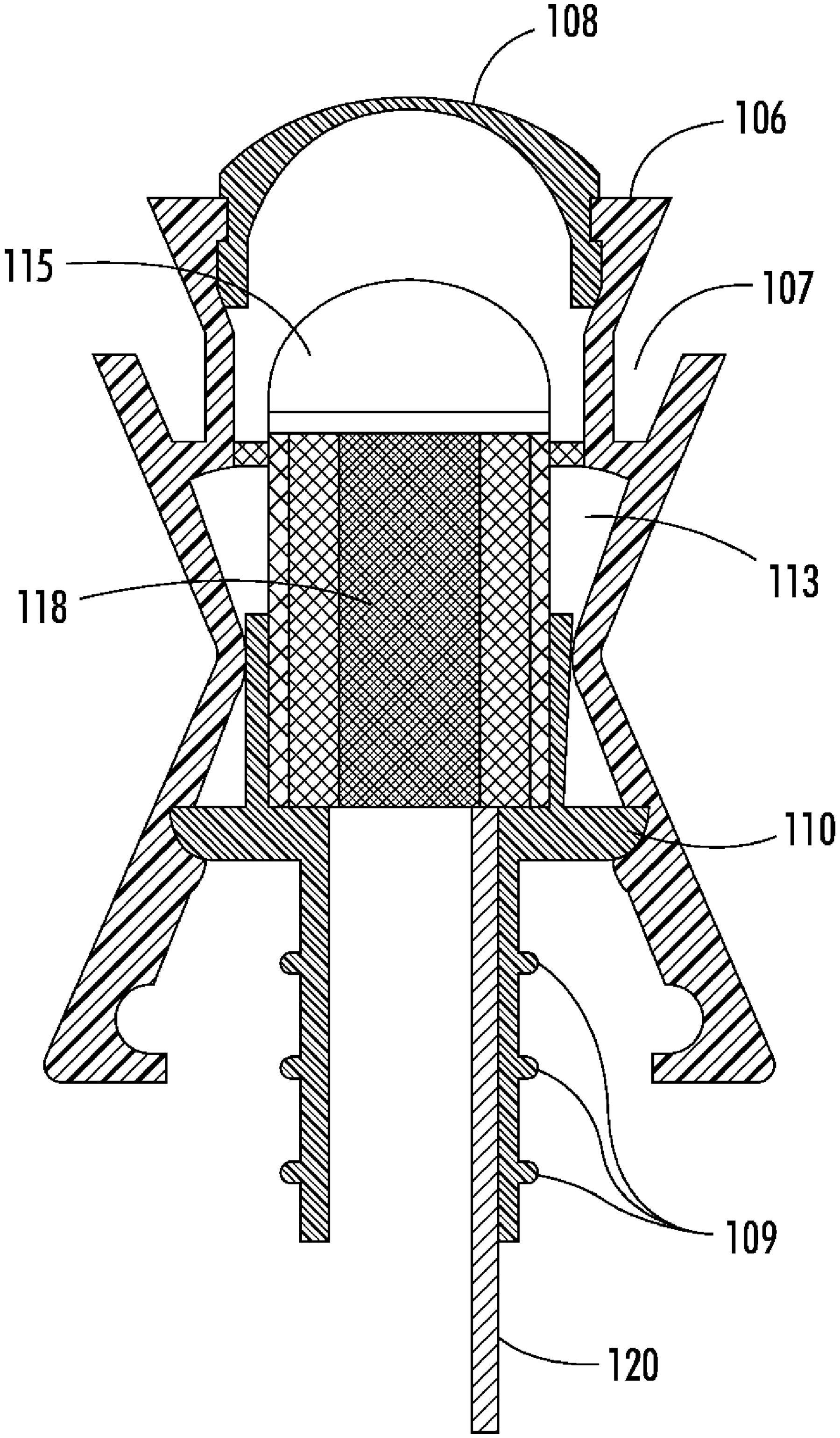
FIG. 6 is a cross-sectional view of the regulator/aerator apparatus.

In the cross-sectional assembly view of the embodiment of FIG. 6, the relationship of each element of the regulator/aerator device is clearly depicted. For example, the regulating cartridge 101, along with air vent 112, is forcibly inserted within housing 103 having labyrinth 118 (e.g., #20—316 Stainless Steel; 1 in.×7.5 in., rolled into approx. 0.75 diameter spiral) and screen 115 (e.g., #20—316 Stainless Steel) formed into a convex shape and captured therebetween.

Figure 7:
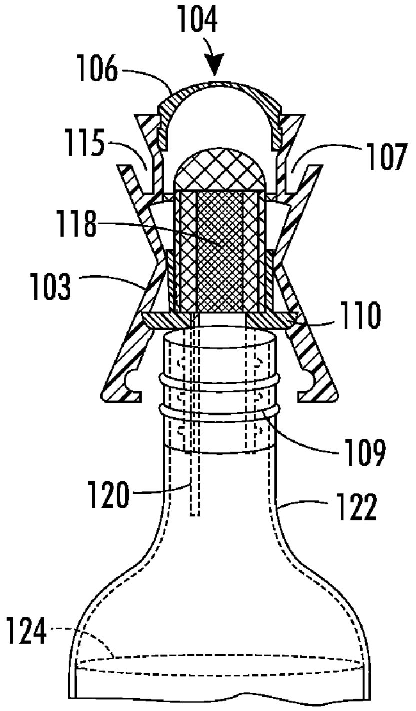
FIG. 7 is a cross-sectional view of the regulator/aerator inserted into a wine bottle.

Next, also referring to FIG. 7, percolation labyrinth 118 is situated directly in-line within the mainstream of the wine being poured through the neck of bottle 122. Resistance to a laminar flow provides a reactive back pressure and when this resistance is caused by a convoluted obstruction, such as percolation labyrinth 118, the laminar flow, in combination with the air drawn into the bottle, becomes turbulent. Accordingly, the outflow of wine 124 is regulated or controlled to a uniform stream due to flow control provided by the combination of percolation labyrinth 118 and the replacement air flow, for example from injector(s) 116 creating a regulating turbulence within regulating cartridge 101. Furthermore, desirable aeration occurs as a secondary effect of drawing air into and through regulating cartridge 101 and associated labyrinth 118. This is attributed to the increased surface area interaction of the turbulent wine and the reduced size of the air bubbles caused by the labyrinth 118 and optionally the plurality of air injecting orifices 116 within manifold 114. Given this combination, the wine is readily aerated within spiral labyrinth 118, to provide a more pleasing taste by the volatilization of sulphurous anhydride.

Figure 8:
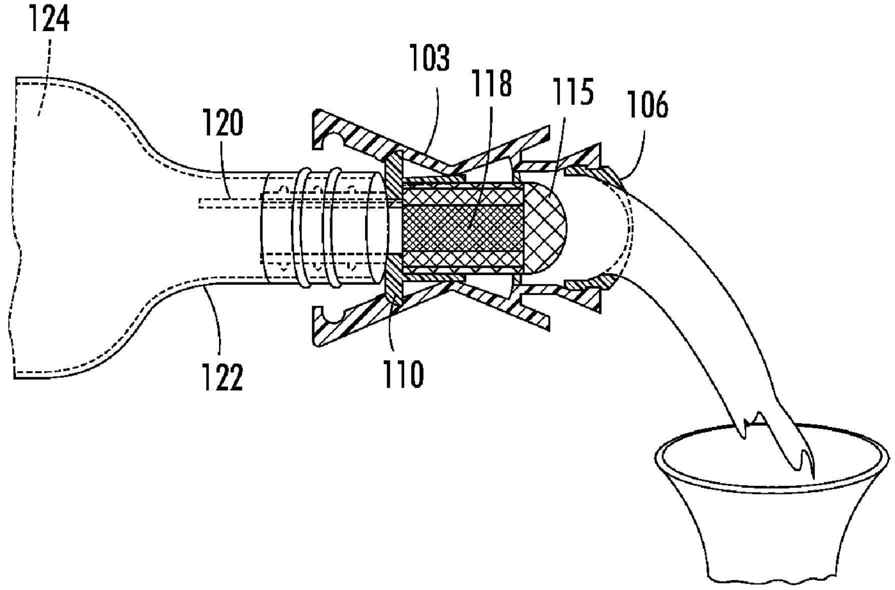
FIG. 8 is a cross-sectional view of the regulator/aerator in the pouring position.

Once the bottle is tipped into a pouring position, as represented in FIG. 8, air is drawn in through vent 112 as a result of two factors; (i) percolation labyrinth 118 provides a turbulent flow of wine 124 within chamber 101, thereby encouraging air to be drawn inwardly through air injector(s) 116 due to a venturi effect, and (ii) as wine is allowed to pass through regulating cartridge 101, a negative pressure develops within the void formed behind wine, thereby furthering the propensity for air to be drawn into the bottle through air vent 112 and injector 116.

As illustrated by the embodiment of FIGS. 7 and 8, there is provided a regulating apparatus for the delivery of a liquid such as wine 124 from a bottle-like container 122. The regulating apparatus comprises a housing 103, covering an opening of bottle 122; having flow regulating cartridge 101, inserted within chamber 113 of housing 103 and extending into an opening of bottle 122, whereby regulating cartridge 101 makes contact with the opening to hold the combined regulating cartridge and the housing within the opening of bottle 124. Air vent 112, operatively associated with regulating cartridge 101, provides a means to equalize air pressure within bottle 122 as liquid is poured through regulating cartridge 101. An aeration region within chamber 113 is used in combination with regulator cartridge 101, including air vent 112, having at least one orifice for introducing air into the wine. Percolation labyrinth 118, associated with regulating cartridge 101, causes a turbulent flow of the wine within the aeration region, as poured from the container through the housing. Annular trough 107, located on an outer exposed surface of housing 103, having a size suitable for collecting residual liquid therein when the container is returned to an upright position after pouring, prevents the regulating apparatus from dripping.

Figure 9:
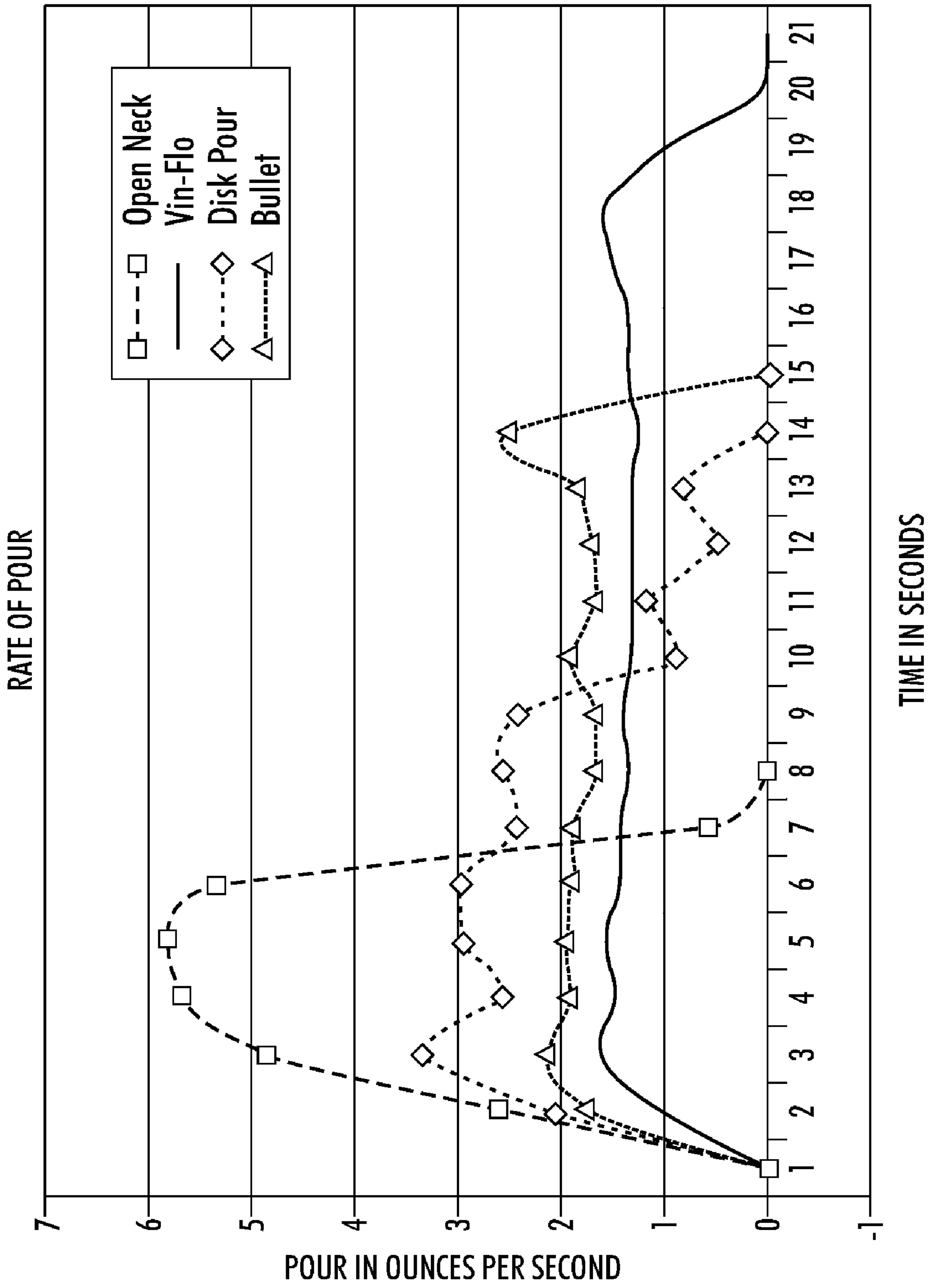
FIG. 9 is a graphical representation of the flow rate of as a function of time with and without the regulator/aerator apparatus.

Referring next to FIG. 9, the rate of flow measured from a bottle positioned in a pouring stare can be expressed in the amount (e.g., volume or weight) of the fluid poured (ounces) per unit time (seconds). FIG. 9 graphically depicts the flow characteristics of a bottle of wine poured using each of four configurations: (i) an open-neck wine bottle; (ii) the wine bottle with one of the embodiments disclosed herein (Vin-Flo); (iii) the wine bottle with a Disk Pour device, Catalog #35-3512 from Epic Products Inc, Fountain Valley, Calif.; and (iv) the wine bottle with a Sparkling Wine Server (referred to as "Bullet") from MSC International Inc. Montreal Canada, (see also U.S. design Pat. No. D421,908).

As illustrated in FIG. 9, the rate of flow has been compared across a common experimental configuration. For the purpose of this analysis the pour angle used had the bottle neck consistently filled with liquid, such as depicted in FIG. 8 (albeit at an angle greater than horizontal). Table A below represents the expulsion of a fluid from the bottle having no provisions for releasing the vacuum formed within the bottle. Remarkably the flow rate is a roughly sinusoidal function of time where the volume is f(x)(sin ϕ) and therewithin lies the problem which the present invention strives to solve. Turning to Table B and FIG. 9 the regulator/aerator embodiments described (see VinFlo results in FIG. 9) provide a near linear rate of flow across the entire pouring cycle of about 20 seconds, albeit further comprising a start/stop integration period of 1-2 seconds where the neck is not entirely flooded. The regulator disclosed in accordance with the embodiment of FIGS. 1-8, in use, provides a consistent flow rate of approximately 1.5 oz/sec. Moreover, experimentation, as well as field testing, confirms this generally linear flow rate to be near or at an optimum pouring rate of between about 1.0 and 2.0 oz/sec and more preferably between about 1.2 to 1.8 oz/sec. Such a rate minimizes the propensity for spillage, and increases the time during which the wine being poured is subject to contact with air.

TABLE A

| OPEN BOTTLE NECK | | | | | |
|---|---|---|---|---|---|
| Seconds | Trial 1 | Trial 2 | Trial 3 | Average | Delta |
| 0 | 0 | 0 | 0 | 0 | 0 |
| 1 | 2.000 | 3.750 | 2.125 | 2.625 | 2.625 |
| 2 | 7.000 | 6.375 | 9.125 | 7.500 | 4.875 |
| 3 | 13.000 | 12.500 | 14.125 | 13.208 | 5.708 |
| 4 | 19.500 | 18.000 | 19.625 | 19.042 | 5.833 |
| 5 | 24.625 | 24.125 | 24.500 | 24.417 | 5.375 |
| 6 | 25.500 | 25.375 | 25.250 | 25.000 | 0.583 |

TABLE B

| POURING REGULATOR AND AERATOR | | | | | |
|---|---|---|---|---|---|
| Seconds | Trial 1 | Trial 2 | Trial 3 | Average | Delta |
| 0 | 0 | 0 | 0 | 0 | 0 |
| 1 | 0.750 | 1.125 | 1.250 | 1.042 | 1.042 |
| 2 | 2.250 | 2.875 | 2.875 | 2.667 | 1.625 |
| 3 | 3.750 | 4.500 | 4.250 | 4.167 | 1.500 |
| 4 | 5.375 | 6.000 | 5.875 | 5.750 | 1.583 |
| 5 | 6.875 | 7.375 | 7.375 | 7.208 | 1.458 |
| 6 | 8.250 | 8.875 | 8.875 | 8.667 | 1.458 |
| 7 | 9.750 | 10.125 | 10.250 | 10.042 | 1.375 |
| 8 | 11.000 | 11.750 | 11.625 | 11.458 | 1.417 |
| 9 | 12.375 | 13.000 | 13.000 | 12.792 | 1.333 |
| 10 | 13.750 | 14.375 | 14.250 | 14.125 | 1.333 |
| 11 | 15.375 | 15.375 | 15.625 | 15.458 | 1.333 |
| 12 | 16.750 | 16.875 | 16.750 | 16.792 | 1.333 |
| 13 | 18.000 | 18.125 | 18.125 | 18.083 | 1.292 |
| 14 | 19.500 | 19.500 | 19.375 | 19.458 | 1.375 |
| 15 | 20.875 | 20.750 | 20.875 | 20.833 | 1.375 |
| 16 | 22.625 | 22.125 | 22.250 | 22.333 | 1.500 |
| 17 | 24.000 | 23.750 | 24.000 | 23.917 | 1.583 |
| 18 | 25.000 | 24.875 | 24.875 | 24.917 | 1.000 |
| 19 | 25.250 | 25.125 | 25.000 | 25.000 | 0.083 |

As a result of the controlled flow, and the combined advantages of aeration, filtering and drip catching, the disclosed regulator with aerator is believed to provide significant advantages in the wine pouring process—particularly when it is desired to carefully pour a limited amount of vintage wine into a glass.

While the embodiments of this invention have been shown and described in some detail, it will be understood that this description and accompanying illustrations are offered merely by way of example, and that the invention is to be limited in scope only by the appended claims.

What is claimed is:

1. A regulating apparatus for the delivery of a liquid from a container, comprising:

a housing covering an opening of a container;

a flow regulating cartridge, inserted within said housing and extending into an opening of the container, said regulating cartridge making contact with the opening to removably affix both the regulating cartridge and the housing within the opening;

an air vent, operatively associated with said regulating cartridge, said air vent equalizing air pressure within the container as liquid is poured through said regulating cartridge; and a percolation labyrinth, associated with said regulating cartridge, said labyrinth causing a turbulent flow of the liquid poured from the container through the housing, wherein said labyrinth consists essentially of a mesh rolled into a spiral coil.

2. The regulating apparatus according to claim 1 wherein the housing further includes a filter screen therewithin through which the liquid passes while being poured.

3. The regulating apparatus according to claim 1 further comprising a cap for sealing the container.

4. The regulating apparatus according to claim 1 wherein said liquid is a wine.

5. The regulating apparatus according to claim 1 wherein said container is a wine bottle.

6. The regulating apparatus according to claim 1 further comprising at least one annular trough located on an outer surface of the housing, said trough collecting residual liquid therein when the container is returned to an upright position after pouring.

7. A regulating apparatus for the delivery of wine from a bottle, comprising:

a housing, said housing covering an open end of a wine bottle;

a regulating cartridge, inserted within said housing and extending into a neck of the bottle, said regulating cartridge making contact with the neck to hold the combined regulating cartridge and the housing in place and sealing the housing to the bottle;

an air vent, operatively associated with said regulating cartridge, said air vent equalizing air pressure within the bottle as liquid is poured therefrom;

a percolation labyrinth, within said regulating cartridge, wherein said labyrinth includes a spiral coil in the form of a longitudinal cylinder, said labyrinth causing a turbulent flow of the wine, as poured from the bottle through the regulating cartridge; and at least one annular trough located on an outer surface of the housing, said trough being of a size suitable for collecting residual wine on a lip of the housing when the bottle is returned to an upright position after pouring, thereby preventing the regulating apparatus from dripping.

8. The regulating apparatus according to claim 7 wherein the housing also includes a filter screen therewithin, through which the wine passes while being poured.

9. The regulating apparatus according to claim 7 further comprising a cap attachable to the housing, said cap sealing the wine from exposure to the atmosphere.

10. The regulating apparatus according to claim 7 wherein said labyrinth consists essentially of #20 mesh of stainless steel rolled into the spiral coil.

11. A regulating apparatus for the delivery of a liquid from a container, comprising:

a housing covering an opening of a container;

a flow regulating cartridge, inserted within said housing and extending into an opening of the container, said regulating cartridge making contact with the opening to removably affix both the regulating cartridge and the housing within the opening;

an air vent, operatively associated with said regulating cartridge, said air vent equalizing air pressure within the container as liquid is poured through said regulating cartridge; and a percolation labyrinth, associated with said regulating cartridge, said labyrinth causing a turbulent flow of the liquid poured from the container through the housing, wherein said labyrinth includes a material sheet rolled into a spiral coil.

12. A regulating apparatus for the delivery of a liquid from a container, comprising:

a housing covering an opening of a container;

a flow regulating cartridge, inserted within said housing and extending into an opening of the container, said regulating cartridge making contact with the opening to removably affix both the regulating cartridge and the housing within the opening;

an air vent, operatively associated with said regulating cartridge, said air vent equalizing air pressure within the container as liquid is poured through said regulating cartridge, further comprising an aeration region in combination with the air vent, said aeration region having at least one orifice for introducing air into the liquid as it is poured from the container through the regulating cartridge; and a percolation labyrinth, associated with said regulating cartridge, said labyrinth causing a turbulent flow of the liquid poured from the container through the housing.

13. A method of pouring a liquid, comprising:

placing a housing containing a flow regulating cartridge including a percolation labyrinth, said percolation labyrinth further including a sheet of material spirally rolled into in the shape of a spiral coil, over the opening of an container;

pouring the liquid causing the liquid to flow through the regulating cartridge, thereby creating a turbulent flow within at least a portion of the liquid being poured through the spiral coil of said percolation labyrinth; and regulating the flow of liquid at a generally consistent rate while concurrently aerating the liquid in said percolation labyrinth as poured.

14. The method of pouring a liquid in claim 13 whereby the liquid is a wine.

15. The method of pouring a liquid in claim 13 whereby the container is a wine bottle.

* * * * *